US009433949B2

(12) United States Patent
Wesselmeier

(10) Patent No.: US 9,433,949 B2
(45) Date of Patent: Sep. 6, 2016

(54) VARIABLE WATER FEATURE NOZZLE

(71) Applicant: OASE GmbH, Hörstel-Riesenbeck (DE)

(72) Inventor: Reinhard Wesselmeier, Hörstel (DE)

(73) Assignee: OASE GmbH, Hörstel-Risenbeck (DE)

( * ) Notice: Subject to any disclaimer, the term of this patent is extended or adjusted under 35 U.S.C. 154(b) by 0 days.

(21) Appl. No.: 14/783,526

(22) PCT Filed: Feb. 6, 2014

(86) PCT No.: PCT/EP2014/000323
§ 371 (c)(1),
(2) Date: Oct. 9, 2015

(87) PCT Pub. No.: WO2014/166563
PCT Pub. Date: Oct. 16, 2014

(65) Prior Publication Data

US 2016/0082448 A1 Mar. 24, 2016

(30) Foreign Application Priority Data

Apr. 9, 2013 (DE) ........................ 10 2013 005 972

(51) Int. Cl.
*B05B 1/06* (2006.01)
*B05B 1/26* (2006.01)
(Continued)

(52) U.S. Cl.
CPC ................ *B05B 1/06* (2013.01); *B05B 1/265* (2013.01); *B05B 1/3073* (2013.01); *B05B 7/061* (2013.01); *B05B 9/01* (2013.01); *B05B 17/085* (2013.01); *B05B 1/34* (2013.01)

(58) Field of Classification Search
CPC ....... B05B 1/06; B05B 1/265; B05B 1/3073; B05B 1/34; B05B 7/061; B05B 9/01; B05B 17/08; B05B 17/085
USPC ........... 239/16, 17, 418, 420, 421, 423, 424, 239/499, 504, 505, 513–515, 518, 523, 524, 239/541, 543
See application file for complete search history.

(56) References Cited

U.S. PATENT DOCUMENTS

| | | | | |
|---|---|---|---|---|
| 1,674,480 | A | 6/1928 | Nelson | |
| 2,530,808 | A | 11/1950 | Cerasi | |
| 3,722,816 | A * | 3/1973 | Stewart .................. | B05B 17/08 239/17 |

(Continued)

FOREIGN PATENT DOCUMENTS

| | | |
|---|---|---|
| AU | 418 454 | 3/1968 |
| DE | 22 40 434 | 2/1973 |

(Continued)

*Primary Examiner* — Darren W Gorman
(74) *Attorney, Agent, or Firm* — Gudrun E. Huckett

(57) ABSTRACT

Disclosed is a water feature nozzle comprising at least two separate water guides (1, 3) each with at least one outlet opening (13, 14), wherein controllably different water volume streams ($V_1$,$V_2$) can be directed to the outlet openings (13, 14) via the water guides (1, 3) in order to generate variable water patterns at a nozzle outlet (9), the water feature nozzle being designed such that an inner water guide (1) is surrounded by at least one outer water guide (3), and both water guides (1, 3) direct parallel-orientated water streams ($V_1$,$V_2$) as far as the nozzle outlet (9). One of the water guides (1, 3) has an adjustable flow deflector (10, 11) on the nozzle outlet (9), which flow deflector (10, 11) annularly encloses the inner water jet.

18 Claims, 3 Drawing Sheets

(51) Int. Cl.

| | |
|---|---|
| ***B05B 1/30*** | (2006.01) |
| ***B05B 7/06*** | (2006.01) |
| ***B05B 17/08*** | (2006.01) |
| ***B05B 9/01*** | (2006.01) |
| *B05B 1/34* | (2006.01) |

(56) References Cited

U.S. PATENT DOCUMENTS 3,737,105 A * 6/1973 Arnold ...................... B05B 1/06
239/423
3,749,311 A * 7/1973 Hruby, Jr. ............... B05B 17/08
239/17
6,250,570 B1 6/2001 Starr et al.
2004/0020999 A1 2/2004 Beidokthi
2005/0109861 A1* 5/2005 Chen ........................ B01J 4/002
239/423

FOREIGN PATENT DOCUMENTS

FR 2 650 762 2/1991
JP S58 92473 6/1983

* cited by examiner

VARIABLE WATER FEATURE NOZZLE

BACKGROUND OF THE INVENTION

The invention concerns a water feature nozzle that comprises at least two water guides that are independent from each other, wherein at least one outlet opening for each water guide is provided, respectively. By means of these water guides, controllable different water volume streams, i.e., variable water quantities per time unit, can be guided to the outlet openings of the water guides in order to generate water patterns that can be varied at the nozzle outlet of the water feature nozzle.

A water feature nozzle of the aforementioned kind is disclosed in U.S. Pat. No. 6,250,570 B1. This nozzle has a central water guide into which several outlet openings of a second water guide open tangentially. By means of the water volume stream of the second water guide, a swirl is imparted to the first water volume stream while it is mixed with the second water volume stream and the rotating mixed water volume stream is then moved farther to the nozzle outlet. Here, different water patterns can result, for example, a sharply delimited high jet or a wide jet that fans out early on, depending on how great the imparted swirl. This is variable by the control of the two water volume streams.

SUMMARY OF THE INVENTION

The invention has the objective to provide a water feature nozzle that enables excellent variability with simplified configuration. This objective is solved by a water feature nozzle with at least two separate water guides with at least one outlet opening, respectively, wherein by means of the water guides controllable different water volume streams can be guided to the outlet openings in order to generate at a nozzle outlet variable water patterns, wherein an inner water guide is surrounded by at least one outer water guide in such a way that both water guides guide parallel oriented water streams as far as the nozzle outlet.

Due to the configuration of the water feature nozzle with an inner water guide that is surrounded in such a way by at least one outer water guide that both water guides guide parallel oriented but separate water streams up to a point immediately before the nozzle outlet, the basic configuration of the nozzle is simple but the variation possibility is great due to the variation of the water volume streams or water quantities per time unit that are guided through the different water guides.

Preferred and constructively simple, the water guides are formed by tubes that are arranged within each other, wherein the outer diameter of the innermost tube is smaller than the inner diameter of the tube surrounding it so that between the two tubes a free space is provided that forms an outer water guide. The construction is not limited to two water guides. It is also possible to arranged three or more tubes within each other.

In an alternative embodiment, a tube is provided as an inner water guide but several outer water guides surrounding it are provided which also form a type of water crown with each other. The tubes or water guides must not be embodied mandatorily to have a circular shape but a circular shape is preferred with regard to design considerations, fluid mechanics, and for reasons of stability.

Also preferred, the water guides or tubes are concentrically arranged. However, it is also possible to configure the water guides in a concentric or eccentric arrangement so as to be movable, for example, slidable, relative to each other so that a further way of affecting the jet pattern is provided. For example, when the outer tube is caused to eccentrically rotate in a controlled fashion about the inner tube, the generated water jet also circulates about the center of the nozzle.

The water supply or water feed can be realized, for example, for the inner tube from the bottom while the water feed for the outer tube is realized laterally. For the water supply also other variants than the aforementioned one are possible. The additional use of a flow aligning device for water calming in one or several of the water guides can be expedient also.

Two or even more separately controllable pumps are connected or can be connected to the water feed. By the ratio of the respective volume streams, the water patterns can be varied already, wherein the shape of the nozzle head can also be partially decisive for the shape of the water pattern.

The nozzle head is preferably formed by a nozzle head that, in turn, is preferably containing one or several flow deflectors. Moreover, variable water patterns can be generated and/or a desired water pattern can be optimized for the inner and/or outer water guide by adjustment of the respective flow deflector.

When an inner flow deflector is present, it can be preferably designed such that it transforms the inner water jet from a water column to a ring of water. This is done, for example, by a mushroom-shaped or conical configuration of the flow deflector. Inasmuch as an outer flow deflector is present, it can be designed, for example, as a cap and can deflect the outer water stream inwardly and make it narrower. When two flow deflectors are present, they can be designed preferably such that they guide the two water streams toward each other. By changing the height of the two flow deflectors relative to each, very different water patterns can be obtained. Preferably, a centering aid is to be provided for the flow deflector in order to position it exactly.

When the volume stream as a function of pressure in the outer tube is greater than that in the inner tube, a slim fountain-like jet shape is obtained. In case of a greater volume stream in the inner tube relative to the outer tube, on the other hand, a wide overhanging fountain in the form of a chalice of only minimal height is generated.

It is preferred to employ pumps that are electronically controllable, for example, by means of a bus system, by means of which the water patterns during operation can be varied continuously. This can be done, for example, also as a function of supplied music whose signals can be tapped immediately. Also, it may be expedient to design the flow deflectors so as to be electronically controllable in order to realize variation possibilities also here in a simple way. When an embodiment with water guides that are movable relative to each other or about each other is selected, this movement can also be electronically controlled for influencing the water pattern.

BRIEF DESCRIPTION OF THE DRAWINGS

Further advantages and details result from the dependent claims and an embodiments that is illustrated in the drawings and is described in the following. It is shown in:

DESCRIPTION OF PREFERRED EMBODIMENTS

Figure 1:
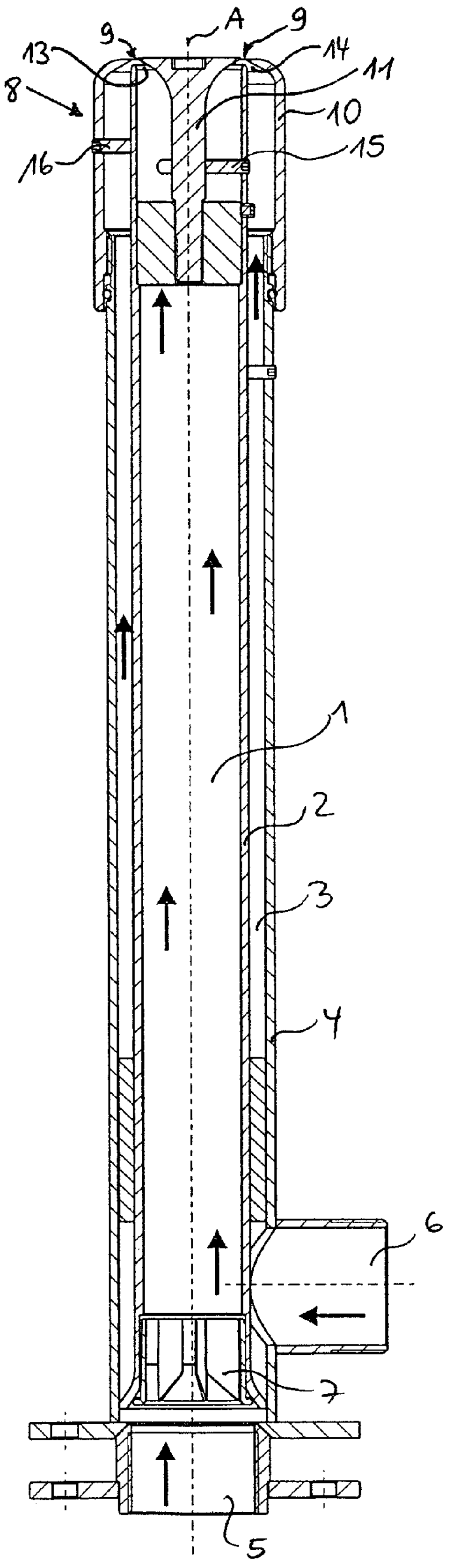
FIG. 1 a water feature nozzle according to the invention in section.

The illustrated water feature nozzle comprises an inner water guide 1 that is formed by an inner tube 2 and an outer water guide 3 surrounding it, formed by the outer wall of the inner tube 2 as well as an outer tube 4. The water supply to these two water guides 1, 3 is realized by connectors wherein a bottom connector 5 is provided for the inner water guide 1 and a lateral connector 6 for the outer water guide 3. Separate pumps, not illustrated, are connected to the two connectors 5, 6. In the lower area of the inner water guide 1, there is also a flow aligning device 7 which calms the flow and imparts to it a uniform upward direction. For the outer water guide 3 this is automatically done due to the more narrow annular channel.

The upper end of the water feature nozzle is formed by a nozzle head 8 which surrounds seal-tightly the outer water guide 3 in the illustrated embodiment. The nozzle head 8 forms a nozzle outlet 9 and comprises an outer flow deflector 10 which is formed with an edge and a central opening. An inner flow deflector 11 is provided also for the inner water guide 1. Both flow deflectors 10, 11 are adjustable in axial direction A, i.e., are adjustable in regard to height and vary in this way the shape and size of the outlet opening 13 of the inner water guide 1 and of the outlet opening 14 of the outer water guide 3. By means of a centering aid 15, here realized by a centering screw, the inner flow deflector 11 can be centered. The same possibility is provided by means of a further centering aid 16 for the outer flow deflector 10.

Figure 2:
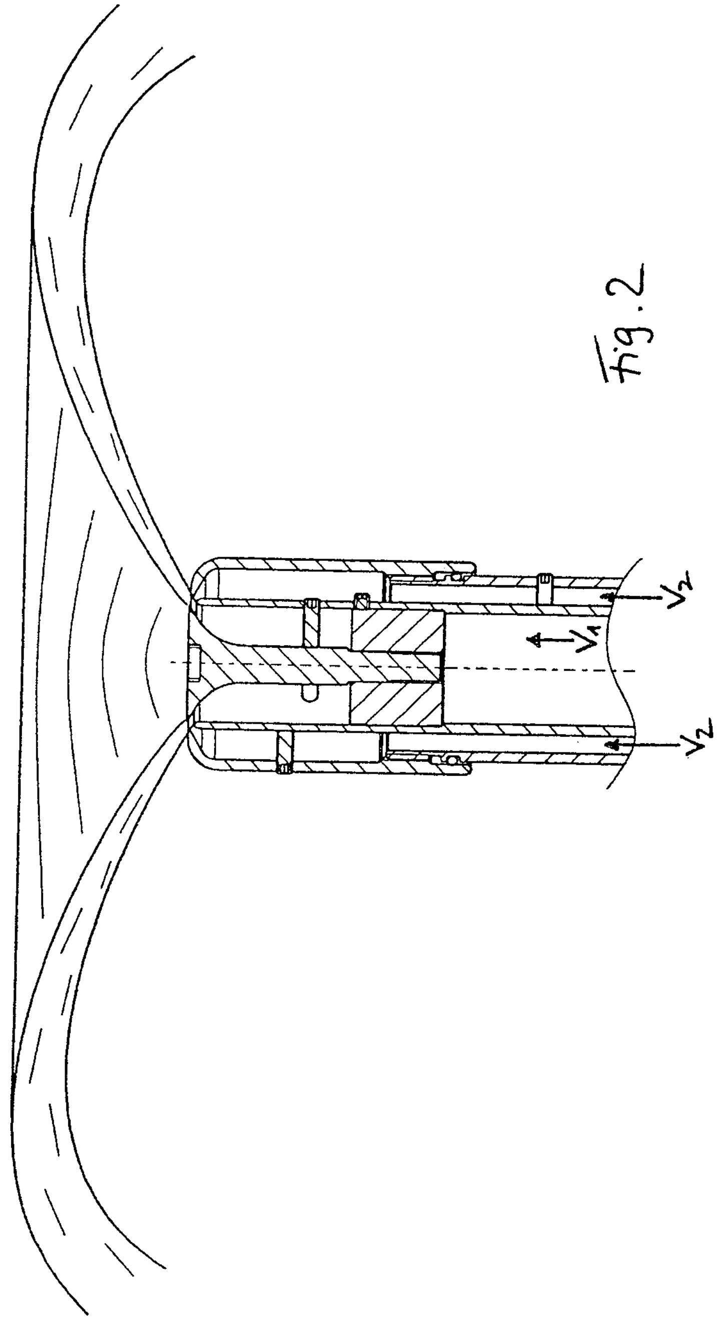
FIG. 2 an upper part of the object of FIG. 1 as it forms a chalice-like water jet.
Figure 3:
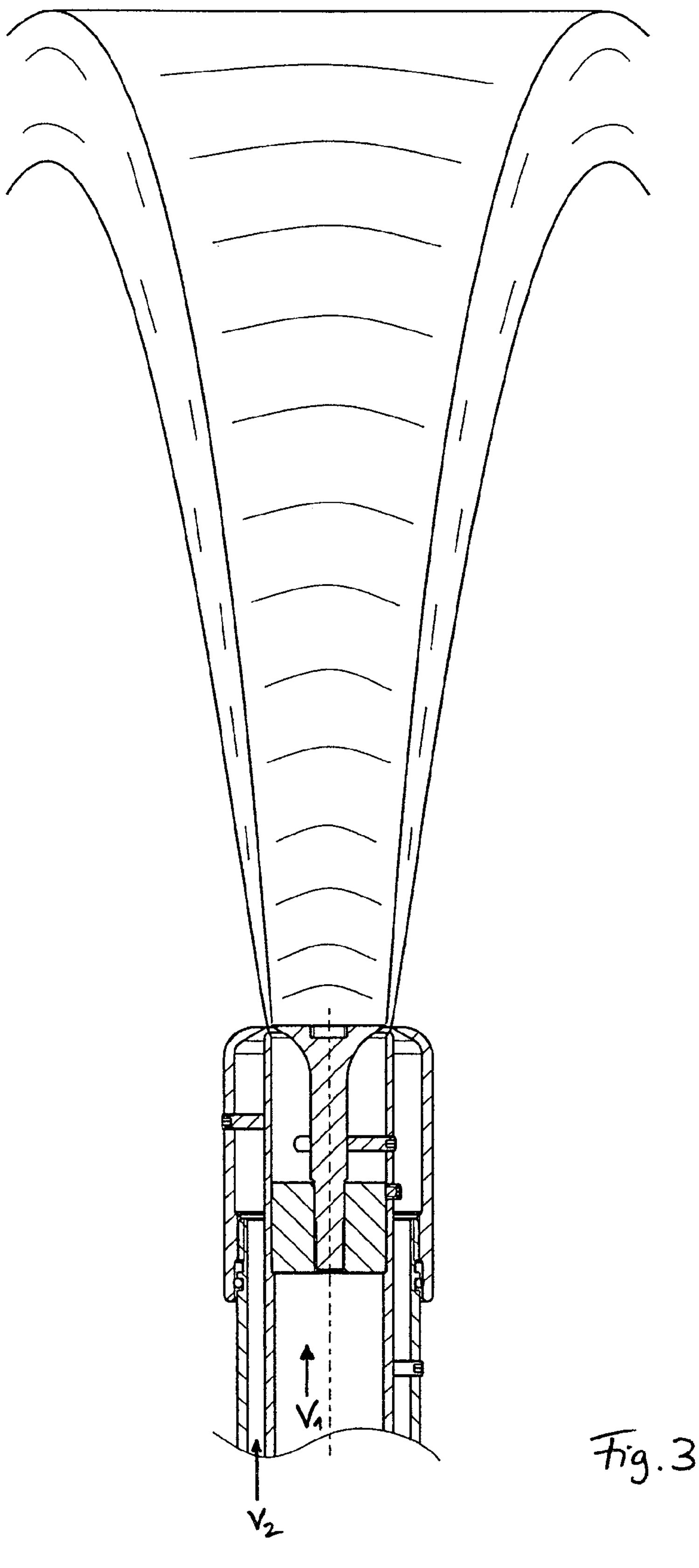
FIG. 3 the object of FIG. 2 with formation of a higher fountain jet.

The volume streams of the pumps, not illustrated, are preferably changeable by control via an electronic bus system by means of which the water patterns can be continuously varied even during operation. For example, the jet pattern of a wide open chalice illustrated in FIG. 2 can be generated when the volume stream $V_1$ in the inner water guide 1 is greater than the volume stream $V_2$ in the outer guide 3. Conversely, for a volume stream $V_2$ in the outer water guide 3 that is greater than the volume stream $V_1$ in the inner water guide 1, the pattern of a high narrow fountain illustrated in FIG. 3 results.

The water feature nozzle according to the invention is constructively simple to realize while it is extremely stable and precisely adjustable. The variation possibilities by means of the supplied volume streams V are considerable.

What is claimed is:

1. A water feature nozzle comprising:

a nozzle outlet;

an inner water guide connected to the nozzle outlet and comprising at least one outlet opening;

at least one outer water guide that is separate from the inner water guide and is connected to the nozzle outlet, wherein the at least one outer water guide surrounds the inner water guide, and wherein the at least one outer water guide comprises at least one outlet opening;

wherein the inner water guide and the at least one outer water guide are configured such that controllable different water volume streams are guided to the at least one outlet opening of the inner water guide and to the at least one outlet opening of the at least one outer guide to generate variable water patterns at the nozzle outlet;

wherein the inner water guide and the at least one outer water guide are configured such that the water volume streams are guided as parallel oriented water streams to the nozzle outlet.

2. The water feature nozzle according to claim 1, wherein the water guides are formed by tubes arranged within each other, wherein the tubes include an innermost tube forming the inner water guide and further include an outer tube surrounding the innermost tube, wherein a free space between the innermost tube and the outer tube forms the at least one outer water guide.

3. The water feature nozzle according to claim 2, wherein the tubes are concentrically arranged.

4. The water feature nozzle according to claim 1, further comprising at least two pumps that are separately controllable, wherein the at least two pumps are connected or connectable to the inner water guide and the at least one outer water guide for supplying water, respectively.

5. The water feature nozzle according to claim 1, wherein the inner water guide is provided with an adjustable flow deflector arranged at the nozzle outlet.

6. The water feature nozzle according to claim 5, wherein the adjustable flow deflector is configured to transform an inner water jet of the inner water guide to a jet of an annular shape.

7. The water feature nozzle according to claim 5, wherein the adjustable flow deflector is a component of a nozzle head forming the nozzle outlet.

8. The water feature nozzle according to claim 1, wherein the at least one outer water guide is provided with an adjustable flow deflector arranged at the nozzle outlet.

9. The water feature nozzle according to claim 8, wherein the adjustable flow deflector is a component of a nozzle head forming the nozzle outlet.

10. The water feature nozzle according to claim 1, wherein the inner water guide is provided with an adjustable flow deflector arranged at the nozzle outlet and wherein the at least one outer water guide is provided with an adjustable flow deflector arranged at the nozzle outlet.

11. The water feature nozzle according to claim 10, wherein the adjustable flow deflector of the inner water guide and the adjustable flow deflector of the at least one outer water guide are configured to be adjusted independently of each other.

12. The water feature nozzle according to claim 10, wherein the adjustable flow deflector of the inner water guide and the adjustable flow deflector of the at least one outer water guide are formed such that the water volume streams are guided toward each other.

13. The water feature nozzle according claim 10, wherein at least one of the adjustable flow deflector of the inner water guide and of the adjustable flow deflector of the at least one outer water guide comprises a centering aid.

14. The water feature nozzle according to claim 10, wherein the adjustable flow deflector of the inner water guide and the adjustable flow deflector of the at least one outer water guide are a component of a nozzle head forming the nozzle outlet.

15. The water feature nozzle according to claim 10, wherein the adjustable flow deflector of the inner water guide and the adjustable flow deflector of the at least one outer water guide are electronically controllable.

16. The water feature nozzle according to claim 15, further comprising at least two pumps that are separately controllable, wherein the at least two pumps are connected or connectable to the inner water guide and the at least one outer water guide for supplying, respectively, and wherein the at least two pumps are electronically controllable.

17. The water feature nozzle according to claim 16, comprising a bus system connected to the adjustable flow deflector of the inner water guide, to the adjustable flow deflector of the at least one outer water guide, and to the at least two pumps for electronic control thereof.

18. The water feature nozzle according to claim 15, comprising a bus system connected to the adjustable flow deflector of the inner water guide and to the adjustable flow deflector of the at least one outer water guide for electronic control thereof.

* * * * *